3,164,508
METHOD FOR BONDING PLASTIC MATERIALS OF THE THERMOPLASTIC TYPE

Stephen D. Marcey, Dayton, Ohio, assignor to The National Cash Register Company, Dayton, Ohio, a corporation of Maryland
No Drawing. Filed Oct. 19, 1961, Ser. No. 146,330
3 Claims. (Cl. 156—273)

The present invention relates to an improved method for bonding plastic materials of the thermoplastic type.

Because of the nature of certain thermoplastic-type plastic materials, considerable difficulty has heretofore been experienced when attempts have been made to bond or weld materials of this type.

In an effort to arrive at a solution to this problem, several methods have been devised, none of which produce entirely satisfactory results.

With one prior art method, a piece of metal is placed between the two surfaces to be bonded and inductively heated until the plastic surfaces melt around the metal. Upon cooling, a fusion of the plastic material around the metal part results. While this method does produce a bonded joint, it is apparent that the metallic piece located between the bonded plastic surfaces reduces the strength of this joint considerably.

Another method of bonding thermoplastic type plastic material which is similar to the induction heating method involves the passage of an electric current through resistance coils of wire which are located between the surfaces to be bonded. As with the induction heating method, the joint is considerably weakened by the inclusion of the resistance wires, in addition to the fact that the points of fusion are located along the wire rather than being evenly distributed over the entire surface area of the bonded joint.

Another prior art method involves the use of a blast of hot gas or air which melts the plastic material in a localized area and, thus, produces fusion upon cooling. With this method, the strength of the weld is not too great in that most of the fusion occurs around the peripheral edges and very little melting or fusion is produced over the surface of the bonded joint.

As the use of thermoplastic type plastic materials is becoming increasingly widespread, and in view of the not too satisfactory results obtained through prior art bonding methods, the requirement of a method which produces a joint of maximum strength is apparent.

It is, therefore, an object of this invention to provide an improved method for bonding plastic materials of the thermoplastic type.

It is another object of this invention to provide an improved method of bonding plastic materials of the thermoplastic type in which fusion occurs over the entire surface of the weld joint.

It is a further object of this invention to provide an improved method for bonding plastic materials of the thermoplastic type employing dielectric heating methods.

In accordance with this invention, the surfaces of thermoplastic type plastic material to be bonded are coated with a gel solution composed of a resin of the plastic to be bonded dispersed in a dielectric solvent material having a high boiling point, the temperature of the gel solution is raised to the boiling point by dielectric heating, and the heated surfaces to be bonded are placed under intimate contact under pressure until bonded.

For a better understanding of the present invention, together with further objects, advantages, and features thereof, reference is made to the following description, which, it is to be understood, is illustrative only, and various modifications, changes, and substitutions may be made without departing from the spirit of this invention.

The method of this invention will be described relative to the bonding of a linear acetal composed of a long unbranched polyoxymethylene chain, a material which has proven to be particularly difficult to bond. This material is commercially available under the trademark "Delrin" and is marketed by E. I. du Pont de Nemours and Company. However, it is to be specifically understood that the principle of this unique method can be applied to other thermoplastic type plastic materials such as the acrylics, the polycarbonates, and the butyrates, for example.

A gel solution is first prepared by dispersing a resin of the plastic to be bonded in a dielectric solvent material having a high boiling point. For optimum results, the boiling point of the solvent material should be higher than the temperature of the melting point of the plastic. As the plastic selected to illustrate the principles of this invention has a melting point of 183.8 degrees centigrade, a suitable solvent in which to disperse the resin of this plastic may be selected from the following group:

| Material | Boiling Point, Degrees Centigrade | Dielectric Constant |
|---|---|---|
| Glycerine | 290 | 42.5 |
| Ethylene Carbonate | 243–244 | 95.3 |
| Propylene Carbonate | 241.7 | 69.0 |

It is to be understood that this group is not exhaustive but is intended to be illustrative only. Other solvents having similar boiling point and dielectric constant characteristics may be used without departing from the spirit of this invention.

A satisfactory gel solution has been found to be 4 parts of the resin to 100 parts of the solvent.

After the gel solution has been prepared, the surfaces of the thermoplastic type plastic material to be bonded are coated with the gel solution by any suitable method such as dipping or painting.

After the bond surfaces have been coated, they are located within the plates of a dielectric heating device, and the gap of the plates is adjusted to a width which leaves a slight air space between the bond assembly and either heater plate. The current and, therefore, the power output of the dielectric heating device may be controlled and adjusted by altering the width of this air space. With the plastic selected to illustrate this method, 220 milliamperes of current were found to produce a satisfactory bond. Other thermoplastic-type plastic materials, such as the acrylics, cellulose acetates, butyrates, polycarbonates, etc., will vary in power requirements to produce satisfactory bonding. The power requirement for a specific plastic may, of course, be arrived at through experimentation.

When the temperature of the gel solution has been raised to its boiling point, since this temperature is slightly above the melting point temperature of the plastic to be bonded, the surfaces of the plastic material to be bonded are in a molten condition. At this time, the heated surfaces are placed under intimate contact pressure until the molten surfaces have cooled to a solidified state.

There are a wide variety of alternatives for placing the heated surfaces under intimate contact pressure. Possibly, the plates of the dielectric heating device may be arranged to be forced together by hydraulic, pneumatic, or mechanical linkages to provide the proper intimate contact pressure which may be of a magnitude only great enough to prevent relative motion between the bond surface until cool. Another alternative may be the use of a specially designed clamping mechanism which may be inserted between the plates of the dielectric heating device and over the pieces to be bonded for the purpose of applying this pressure. The arrangement employed is, of course, a matter of convenience and forms no part of the invention. The two foregoing alternatives are merely suggestions of possible solutions and are not intended to be restrictive.

After the molten surfaces of the pieces to be bonded have cooled and returned to their original solidified state, the pieces may be removed from the clamping device, and the operation is completed.

Because of the thorough heating characteristics of the dielectric method employed, the entire bond surface is evenly heated, and fusion, therefore, extends completely over the overlapped bonded surfaces.

While a preferred embodiment of the present invention has been disclosed and described, it will be obvious to those skilled in the art that various modifications and substitutions may be made without departing from the spirit of the invention, which is intended to be limited only within the scope of the appended claims.

What is claimed is:

1. The method of bonding plastic materials of the thermoplastic type comprising the steps of coating the surfaces to be bonded with a gel solution composed of a resin of the plastic to be bonded dispersed in a dielectric solvent material having a boiling point temperature at least as high as the melting point temperature of the plastic to be bonded, dielectrically heating the coated surfaces to the boiling point of the gel solution, and placing the heated surfaces to be bonded in intimate contact with each other until bonded.

2. The method of bonding plastic materials of the thermoplastic type comprising the steps of preparing a gel solution by dispersing a resin of the plastic to be bonded in a dielectric solvent material having a boiling point temperature at least as high as the melting point temperature of the plastic to be bonded, coating the surfaces to be bonded with the said gel solution, dielectrically heating the coated surfaces to the boiling point of the gel solution, and placing the heated surfaces in intimate contact with each other until the molten surfaces have cooled to a solidified state.

3. The method of bonding plastic materials of the thermoplastic type comprising the steps of preparing a gel solution by dispersing a resin of the plastic to be bonded in a dielectric solvent material having a boiling point temperature at least as high as the melting point temperature of the plastic to be bonded, coating the surfaces to be bonded with said gel solution, and placing the coated surfaces in intimate contact with each other, dielectrically heating the coated surfaces to the boiling point of the gel solution, and removing the dielectric heating energy to permit the molten surfaces to cool while in intimate contact with each other.

References Cited in the file of this patent

UNITED STATES PATENTS

| | | |
|---|---|---|
| 2,823,156 | Hedges | Feb. 11, 1958 |
| 2,859,153 | Zucht | Nov. 4, 1958 |
| 2,992,958 | Yamaguchi | July 18, 1961 |

OTHER REFERENCES

Chemical Engineering, vol. 68, April 3, 1961, pp. 110, 111; TNIM 45.